United States Patent
Lardy et al.

(10) Patent No.: US 8,663,483 B2
(45) Date of Patent: Mar. 4, 2014

(54) RADIAL VANE PACK FOR ROTARY SEPARATORS

(75) Inventors: Pascal Lardy, Houston, TX (US); H. Allan Kidd, Shinglehouse, PA (US); William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/704,693

(22) PCT Filed: Jun. 28, 2011

(86) PCT No.: PCT/US2011/042209
§ 371 (c)(1),
(2), (4) Date: Aug. 14, 2013

(87) PCT Pub. No.: WO2012/009159
PCT Pub. Date: Jan. 19, 2012

(65) Prior Publication Data
US 2013/0333566 A1    Dec. 19, 2013

Related U.S. Application Data

(60) Provisional application No. 61/364,678, filed on Jul. 15, 2010.

(51) Int. Cl.
*B01D 17/038* (2006.01)
*B04B 5/02* (2006.01)
*B04B 5/04* (2006.01)

(52) U.S. Cl.
USPC ............ 210/787; 210/360.1; 210/380.1; 210/380.3; 96/216; 55/337; 55/457; 494/43

(58) Field of Classification Search
USPC ........... 210/360.1, 380.1, 380.3, 787; 96/216; 55/337, 457; 494/43
See application file for complete search history.

(56) References Cited

U.S. PATENT DOCUMENTS

| 815,812 A | 3/1906 | Gow |
| 1,057,613 A | 4/1913 | Baldwin |

(Continued)

FOREIGN PATENT DOCUMENTS

| AU | 2005282269 | 9/2005 |
| CA | 2578262 | 9/2005 |

(Continued)

OTHER PUBLICATIONS

Bi-Phase Rotary Separator Turbine, Multiphase Power & Processing Technologies LLC Technical literature (available at http://www.mpptech.com/techppp/pdfs/Bi-Phase.pdf).

(Continued)

*Primary Examiner* — David A Reifsnyder
(74) *Attorney, Agent, or Firm* — Edmonds & Nolte, PC

(57) ABSTRACT

Apparatus and methods for separating a fluid, with the apparatus including an inner drum wall disposed around and coupled to a shaft. The apparatus also includes an outer drum wall disposed around the inner drum wall, the outer drum wall being configured to rotate to separate a higher-density component of the fluid from a lower-density component of the fluid. The apparatus further includes a first radial vane disposed between the inner drum wall and the outer drum wall and having first contours configured to turn the fluid in at least one of a radially-inward direction and a radially-outward direction. The apparatus also includes a housing at least partially surrounding the outer drum wall and configured to receive the high-density component of the fluid therefrom.

20 Claims, 4 Drawing Sheets

FIG. 2

(56) References Cited

U.S. PATENT DOCUMENTS

| | | |
|---|---|---|
| 1,061,656 A | 5/1913 | Black |
| 1,480,775 A | 1/1924 | Marien |
| 1,622,768 A | 3/1927 | Cook |
| 1,642,454 A | 9/1927 | Malmstrom |
| 2,006,244 A | 6/1935 | Kopsa |
| 2,300,766 A | 11/1942 | Baumann |
| 2,328,031 A | 8/1943 | Risley |
| 2,345,437 A | 3/1944 | Tinker |
| 2,347,939 A | 5/1944 | Down |
| 2,383,244 A | 8/1945 | Farmer |
| 2,720,313 A | 12/1951 | Pattison |
| 2,602,462 A | 7/1952 | Barrett |
| 2,743,865 A | 5/1956 | Graae |
| 2,811,303 A | 10/1957 | Ault |
| 2,836,117 A | 5/1958 | Lankford |
| 2,868,565 A | 1/1959 | Suderow |
| 2,897,917 A | 8/1959 | Hunter |
| 2,932,360 A | 4/1960 | Hungate |
| 2,954,841 A | 10/1960 | Reistle |
| 2,955,673 A | 10/1960 | Kennedy |
| 3,044,657 A | 7/1962 | Horton |
| 3,175,572 A | 3/1965 | Kauer, Jr. |
| 3,191,364 A | 6/1965 | Sylvan |
| 3,198,214 A | 8/1965 | Lorenz |
| 3,204,696 A | 9/1965 | De Priester |
| 3,213,794 A | 10/1965 | Adams |
| 3,220,245 A | 11/1965 | Van Winkle |
| 3,273,325 A | 9/1966 | Gerhold |
| 3,341,111 A | 9/1967 | Sanders |
| 3,352,577 A | 11/1967 | Medney |
| 3,395,511 A | 8/1968 | Ernst |
| 3,402,434 A | 9/1968 | Kajimura |
| 3,431,747 A | 3/1969 | Hasheimi |
| 3,454,163 A | 7/1969 | Read |
| 3,487,432 A | 12/1969 | Jenson |
| 3,490,209 A | 1/1970 | Fernandes |
| 3,500,614 A | 3/1970 | Soo |
| 3,548,568 A | 12/1970 | Carlson, Jr. |
| 3,578,342 A | 5/1971 | Satterthwaite et al. |
| 3,628,812 A | 12/1971 | Larraide et al. |
| 3,646,727 A | 3/1972 | Wachsmuth |
| 3,672,733 A | 6/1972 | Arsenius |
| 3,694,103 A | 9/1972 | Cohen |
| 3,810,347 A | 5/1974 | Kartinen |
| 3,814,486 A | 6/1974 | Schurger |
| 3,829,179 A | 8/1974 | Kurita |
| 3,915,673 A | 10/1975 | Tamai |
| 3,973,930 A | 8/1976 | Burgess |
| 3,975,123 A | 8/1976 | Schibbye |
| 4,033,647 A | 7/1977 | Beavers |
| 4,043,353 A | 8/1977 | Shirey |
| 4,059,364 A | 11/1977 | Anderson |
| 4,078,809 A | 3/1978 | Garrick |
| 4,087,261 A | 5/1978 | Hays |
| 4,103,899 A | 8/1978 | Turner |
| 4,112,687 A | 9/1978 | Dixon |
| 4,117,359 A | 9/1978 | Wehde |
| 4,135,542 A | 1/1979 | Chisholm |
| 4,141,283 A | 2/1979 | Swanson |
| 4,146,261 A | 3/1979 | Edmaier |
| 4,165,622 A | 8/1979 | Brown, Jr. |
| 4,174,925 A | 11/1979 | Pfenning |
| 4,182,480 A | 1/1980 | Theyse |
| 4,197,990 A | 4/1980 | Carberg et al. |
| 4,205,927 A | 6/1980 | Simmons |
| 4,227,373 A | 10/1980 | Amend |
| 4,258,551 A | 3/1981 | Ritzi |
| 4,259,045 A | 3/1981 | Teruyama |
| 4,278,200 A | 7/1981 | Gunnewig |
| 4,298,311 A | 11/1981 | Ritzi |
| 4,303,372 A | 12/1981 | Caffrey |
| 4,333,748 A | 6/1982 | Erickson |
| 4,334,592 A | 6/1982 | Fair |
| 4,336,693 A | 6/1982 | Hays |
| 4,339,923 A | 7/1982 | Hays |
| 4,347,900 A | 9/1982 | Barrington |
| 4,363,608 A | 12/1982 | Mulders |
| 4,374,583 A | 2/1983 | Barrington |
| 4,375,975 A | 3/1983 | McNicholas |
| 4,382,804 A | 5/1983 | Mellor |
| 4,384,724 A | 5/1983 | Derman |
| 4,391,102 A | 7/1983 | Studhalter |
| 4,396,361 A | 8/1983 | Fraser |
| 4,432,470 A | 2/1984 | Sopha |
| 4,438,638 A | 3/1984 | Hays |
| 4,441,322 A | 4/1984 | Ritzi |
| 4,442,925 A | 4/1984 | Fukushima |
| 4,453,893 A | 6/1984 | Hutmaker |
| 4,453,894 A | 6/1984 | Ferone |
| 4,463,567 A | 8/1984 | Amend |
| 4,468,234 A | 8/1984 | McNicholas |
| 4,471,795 A | 9/1984 | Linhardt |
| 4,477,223 A | 10/1984 | Giroux |
| 4,502,839 A | 3/1985 | Maddox |
| 4,511,309 A | 4/1985 | Maddox |
| 4,531,888 A | 7/1985 | Buchelt |
| 4,536,134 A | 8/1985 | Huiber |
| 4,541,531 A | 9/1985 | Brule |
| 4,541,607 A | 9/1985 | Hotger |
| 4,573,527 A | 3/1986 | McDonough |
| 4,574,815 A | 3/1986 | West |
| 4,648,806 A | 3/1987 | Alexander |
| 4,650,578 A | 3/1987 | Cerdan |
| 4,687,017 A | 8/1987 | Danko |
| 4,721,561 A | 1/1988 | Oetiker |
| 4,737,081 A | 4/1988 | Nakajima |
| 4,752,185 A | 6/1988 | Butler |
| 4,807,664 A | 2/1989 | Wilson |
| 4,813,495 A | 3/1989 | Leach |
| 4,821,737 A | 4/1989 | Nelson |
| 4,826,403 A | 5/1989 | Catlow |
| 4,830,331 A | 5/1989 | Vindum |
| 4,832,709 A | 5/1989 | Nagyszalanczy |
| 4,904,284 A | 2/1990 | Hanabusa |
| 4,984,830 A | 1/1991 | Saunders |
| 5,007,328 A | 4/1991 | Otteman |
| 5,024,585 A | 6/1991 | Kralovec |
| 5,043,617 A | 8/1991 | Rostron |
| 5,044,701 A | 9/1991 | Watanabe |
| 5,045,046 A | 9/1991 | Bond |
| 5,054,995 A | 10/1991 | Kaseley |
| 5,064,452 A | 11/1991 | Yano |
| 5,080,137 A | 1/1992 | Adams |
| 5,163,895 A | 11/1992 | Titus |
| 5,190,440 A | 3/1993 | Maier |
| 5,202,024 A | 4/1993 | Andersson et al. |
| 5,202,026 A | 4/1993 | Lema |
| 5,203,891 A | 4/1993 | Lema |
| 5,207,810 A | 5/1993 | Sheth |
| 5,211,427 A | 5/1993 | Washizu |
| 5,244,479 A | 9/1993 | Dean, II |
| 5,246,346 A | 9/1993 | Schiesser |
| 5,280,766 A | 1/1994 | Mohn |
| 5,285,123 A | 2/1994 | Kataoka |
| 5,306,051 A | 4/1994 | Loker |
| 5,337,779 A | 8/1994 | Fukuhara |
| 5,378,121 A | 1/1995 | Hackett |
| 5,382,141 A | 1/1995 | Stinessen |
| 5,385,446 A | 1/1995 | Hays |
| 5,412,977 A | 5/1995 | Schmohl et al. |
| 5,421,708 A | 6/1995 | Utter |
| 5,443,581 A | 8/1995 | Malone |
| 5,464,536 A | 11/1995 | Rogers |
| 5,484,521 A | 1/1996 | Kramer |
| 5,496,394 A | 3/1996 | Nied |
| 5,500,039 A | 3/1996 | Mori |
| 5,525,034 A | 6/1996 | Hays |
| 5,525,146 A | 6/1996 | Straub |
| 5,531,811 A | 7/1996 | Kloberdanz |
| 5,538,259 A | 7/1996 | Uhmer |
| 5,542,831 A | 8/1996 | Scarfone |
| 5,575,309 A | 11/1996 | Connell |
| 5,575,615 A | 11/1996 | Mohn |
| 5,585,000 A | 12/1996 | Sassi |

(56) References Cited

U.S. PATENT DOCUMENTS

| | | |
|---|---|---|
| 5,605,172 A | 2/1997 | Schubert |
| 5,622,621 A | 4/1997 | Kramer |
| 5,628,623 A | 5/1997 | Skaggs |
| 5,634,492 A | 6/1997 | Steinruck |
| 5,640,472 A | 6/1997 | Meinzer |
| 5,641,280 A | 6/1997 | Timuska |
| 5,653,347 A | 8/1997 | Larsson |
| 5,664,420 A | 9/1997 | Hays |
| 5,682,759 A | 11/1997 | Hays |
| 5,683,235 A | 11/1997 | Welch |
| 5,685,691 A | 11/1997 | Hays |
| 5,687,249 A | 11/1997 | Kato |
| 5,693,125 A | 12/1997 | Dean |
| 5,703,424 A | 12/1997 | Dorman |
| 5,709,528 A | 1/1998 | Hablanian |
| 5,713,720 A | 2/1998 | Barhoum |
| 5,720,799 A | 2/1998 | Hays |
| 5,749,391 A | 5/1998 | Loutzenhiser |
| 5,750,040 A | 5/1998 | Hays |
| 5,775,882 A | 7/1998 | Kiyokawa |
| 5,779,619 A | 7/1998 | Borgstrom |
| 5,795,135 A | 8/1998 | Nyilas |
| 5,800,092 A | 9/1998 | Nill |
| 5,848,616 A | 12/1998 | Vogel |
| 5,850,857 A | 12/1998 | Simpson |
| 5,853,585 A | 12/1998 | Nesseth |
| 5,861,052 A | 1/1999 | Meinander |
| 5,863,023 A | 1/1999 | Evans |
| 5,899,435 A | 5/1999 | Mitsch |
| 5,935,053 A | 8/1999 | Strid |
| 5,938,803 A | 8/1999 | Dries |
| 5,938,819 A | 8/1999 | Seery |
| 5,946,915 A | 9/1999 | Hays |
| 5,951,066 A | 9/1999 | Lane |
| 5,965,022 A | 10/1999 | Gould |
| 5,967,746 A | 10/1999 | Hagi |
| 5,971,702 A | 10/1999 | Afton |
| 5,971,907 A | 10/1999 | Johannemann |
| 5,980,218 A | 11/1999 | Takahashi |
| 5,988,524 A | 11/1999 | Odajima |
| 6,027,311 A | 2/2000 | Hill |
| 6,035,934 A | 3/2000 | Stevenson |
| 6,059,539 A | 5/2000 | Nyilas |
| 6,068,447 A | 5/2000 | Foege |
| 6,090,174 A | 7/2000 | Douma |
| 6,090,299 A | 7/2000 | Hays |
| 6,113,675 A | 9/2000 | Branstetter |
| 6,122,915 A | 9/2000 | Hays |
| 6,123,363 A | 9/2000 | Burgard |
| 6,145,844 A | 11/2000 | Waggott |
| 6,149,825 A | 11/2000 | Gargas |
| 6,151,881 A | 11/2000 | Ai |
| 6,187,208 B1 | 2/2001 | White |
| 6,196,962 B1 | 3/2001 | Purvey |
| 6,206,202 B1 | 3/2001 | Galk |
| 6,214,075 B1 | 4/2001 | Filges |
| 6,217,637 B1 | 4/2001 | Toney |
| 6,227,379 B1 | 5/2001 | Nesseth |
| 6,277,278 B1 | 8/2001 | Conrad |
| 6,312,021 B1 | 11/2001 | Thomas |
| 6,314,738 B1 | 11/2001 | Hays |
| 6,372,006 B1 | 4/2002 | Pregenzer |
| 6,375,437 B1 | 4/2002 | Nolan |
| 6,383,262 B1 | 5/2002 | Marthinsen |
| 6,394,764 B1 | 5/2002 | Samurin |
| 6,398,973 B1 | 6/2002 | Saunders |
| 6,402,465 B1 | 6/2002 | Maier |
| 6,426,010 B1 | 7/2002 | Lecoffre |
| 6,464,469 B1 | 10/2002 | Grob |
| 6,467,988 B1 | 10/2002 | Czachor |
| 6,468,426 B1 | 10/2002 | Klass |
| 6,485,536 B1 | 11/2002 | Masters |
| 6,530,484 B1 | 3/2003 | Bosman |
| 6,530,979 B2 | 3/2003 | Firey |
| 6,531,066 B1 | 3/2003 | Sauders |
| 6,537,035 B2 | 3/2003 | Shumway |
| 6,540,917 B1 | 4/2003 | Rachels et al. |
| 6,547,037 B2 | 4/2003 | Kuzdzal |
| 6,592,654 B2 | 7/2003 | Brown |
| 6,596,046 B2 | 7/2003 | Conrad |
| 6,599,086 B2 | 7/2003 | Soja |
| 6,607,348 B2 | 8/2003 | Jean |
| 6,616,719 B1 | 9/2003 | Sun |
| 6,617,731 B1 | 9/2003 | Goodnick |
| 6,629,825 B2 | 10/2003 | Stickland |
| 6,631,617 B1 | 10/2003 | Dreiman |
| 6,658,986 B2 | 12/2003 | Pitla |
| 6,659,143 B1 | 12/2003 | Taylor |
| 6,669,845 B2 | 12/2003 | Klass |
| 6,688,802 B2 | 2/2004 | Ross |
| 6,707,200 B2 | 3/2004 | Carroll |
| 6,718,955 B1 | 4/2004 | Knight |
| 6,719,830 B2 | 4/2004 | Illingworth |
| 6,764,284 B2 | 7/2004 | Oehman |
| 6,776,812 B2 | 8/2004 | Komura |
| 6,802,693 B2 | 10/2004 | Reinfeld |
| 6,802,881 B2 | 10/2004 | Illingworth |
| 6,811,713 B2 | 11/2004 | Arnaud |
| 6,817,846 B2 | 11/2004 | Bennitt |
| 6,827,974 B2 | 12/2004 | Nelson |
| 6,837,913 B2 | 1/2005 | Schilling |
| 6,843,836 B2 | 1/2005 | Kitchener |
| 6,878,187 B1 | 4/2005 | Hays |
| 6,893,208 B2 | 5/2005 | Frosini |
| 6,907,933 B2 | 6/2005 | Choi |
| 6,979,358 B2 | 12/2005 | Ekker |
| 7,000,893 B2 | 2/2006 | Yakushi |
| 7,001,448 B1 | 2/2006 | West |
| 7,013,978 B2 | 3/2006 | Appleford |
| 7,022,150 B2 | 4/2006 | Borgström |
| 7,022,153 B2 | 4/2006 | McKenzie |
| 7,025,890 B2 | 4/2006 | Moya |
| 7,033,410 B2 | 4/2006 | Hilpert |
| 7,033,411 B2 | 4/2006 | Carlsson |
| 7,056,363 B2 | 6/2006 | Carlsson |
| 7,063,465 B1 | 6/2006 | Wilkes |
| 7,112,036 B2 | 9/2006 | Lubell |
| 7,131,292 B2 | 11/2006 | Ikegami |
| 7,144,226 B2 | 12/2006 | Pugnet |
| 7,159,723 B2 | 1/2007 | Hilpert |
| 7,160,518 B2 | 1/2007 | Chen |
| 7,169,305 B2 | 1/2007 | Gomez |
| 7,185,447 B2 | 3/2007 | Arbeiter |
| 7,204,241 B2 | 4/2007 | Thompson |
| 7,241,392 B2 | 7/2007 | Maier |
| 7,244,111 B2 | 7/2007 | Suter |
| 7,258,713 B2 | 8/2007 | Eubank |
| 7,270,145 B2 | 9/2007 | Koezler |
| 7,288,139 B1 | 10/2007 | Showalter |
| 7,288,202 B2 | 10/2007 | Maier |
| 7,314,560 B2 | 1/2008 | Yoshida |
| 7,323,023 B2 | 1/2008 | Michele et al. |
| 7,328,749 B2 | 2/2008 | Reitz |
| 7,335,313 B2 | 2/2008 | Moya |
| 7,377,110 B2 | 5/2008 | Sheridan et al. |
| 7,381,235 B2 | 6/2008 | Koene |
| 7,396,373 B2 | 7/2008 | Lagerstedt |
| 7,399,412 B2 | 7/2008 | Keuschnigg |
| 7,435,290 B2 | 10/2008 | Lane |
| 7,445,653 B2 | 11/2008 | Trautmann |
| 7,470,299 B2 | 12/2008 | Han |
| 7,473,083 B2 | 1/2009 | Oh |
| 7,479,171 B2 | 1/2009 | Cho |
| 7,494,523 B2 | 2/2009 | Oh |
| 7,501,002 B2 | 3/2009 | Han |
| 7,520,210 B2 | 4/2009 | Theodore, Jr. |
| 7,575,422 B2 | 8/2009 | Bode |
| 7,578,863 B2 | 8/2009 | Becker |
| 7,591,882 B2 | 9/2009 | Harazim |
| 7,594,941 B2 | 9/2009 | Zheng |
| 7,594,942 B2 | 9/2009 | Polderman |
| 7,610,955 B2 | 11/2009 | Irwin |
| 7,628,836 B2 | 12/2009 | Barone |
| 7,637,699 B2 | 12/2009 | Albrecht |

(56) References Cited

U.S. PATENT DOCUMENTS

| | | |
|---|---|---|
| 7,674,377 B2 | 3/2010 | Carew |
| 7,677,308 B2 | 3/2010 | Kolle |
| 7,708,537 B2 | 5/2010 | Bhatia |
| 7,708,808 B1 | 5/2010 | Heumann |
| 7,744,663 B2 | 6/2010 | Wallace |
| 7,748,079 B2 | 7/2010 | McDowell |
| 7,766,989 B2 | 8/2010 | Lane |
| 7,811,344 B1 | 10/2010 | Duke |
| 7,811,347 B2 | 10/2010 | Carlsson |
| 7,815,415 B2 | 10/2010 | Kanezawa |
| 7,824,458 B2 | 11/2010 | Borgstrom et al. |
| 7,824,459 B2 | 11/2010 | Borgstrom et al. |
| 7,846,228 B1 | 12/2010 | Saaaki |
| 7,938,874 B2 | 5/2011 | Auber |
| 2002/0009361 A1 | 1/2002 | Reichert |
| 2003/0029318 A1 | 2/2003 | Firey |
| 2003/0035718 A1 | 2/2003 | Langston |
| 2003/0136094 A1 | 7/2003 | Illingworth |
| 2003/0192718 A1 | 10/2003 | Buckman |
| 2004/0007261 A1 | 1/2004 | Cornwell |
| 2004/0170505 A1 | 9/2004 | Lenderink |
| 2005/0173337 A1 | 8/2005 | Costinel |
| 2005/0241178 A1 | 11/2005 | Arbeiter |
| 2006/0065609 A1 | 3/2006 | Arthur |
| 2006/0090430 A1 | 5/2006 | Trautman |
| 2006/0096933 A1 | 5/2006 | Maier |
| 2006/0157251 A1 | 7/2006 | Stinessen |
| 2006/0157406 A1 | 7/2006 | Maier |
| 2006/0193728 A1 | 8/2006 | Lindsey |
| 2006/0222515 A1 | 10/2006 | Delmotte |
| 2006/0230933 A1 | 10/2006 | Harazim |
| 2006/0239831 A1 | 10/2006 | Garris, Jr. |
| 2006/0254659 A1 | 11/2006 | Ballott |
| 2006/0275160 A1 | 12/2006 | Leu |
| 2007/0029091 A1 | 2/2007 | Stinessen |
| 2007/0036646 A1 | 2/2007 | Nguyen |
| 2007/0051245 A1 | 3/2007 | Yun |
| 2007/0062374 A1 | 3/2007 | Kolle |
| 2007/0065317 A1 | 3/2007 | Stock |
| 2007/0084340 A1 | 4/2007 | Dou |
| 2007/0140815 A1 | 6/2007 | Shinozaki |
| 2007/0140870 A1 | 6/2007 | Fukanuma |
| 2007/0151922 A1 | 7/2007 | Mian |
| 2007/0163215 A1 | 7/2007 | Lagerstadt |
| 2007/0172363 A1 | 7/2007 | Laboube |
| 2007/0196215 A1 | 8/2007 | Frosini |
| 2007/0227969 A1 | 10/2007 | Dehaene |
| 2007/0256398 A1 | 11/2007 | Barone et al. |
| 2007/0294986 A1 | 12/2007 | Beetz |
| 2008/0031732 A1 | 2/2008 | Peer |
| 2008/0039732 A9 | 2/2008 | Bowman |
| 2008/0179261 A1 | 7/2008 | Patrovsky |
| 2008/0246281 A1 | 10/2008 | Agrawal |
| 2008/0315812 A1 | 12/2008 | Balboul |
| 2009/0013658 A1 | 1/2009 | Borgstrom |
| 2009/0015012 A1 | 1/2009 | Metzler |
| 2009/0025562 A1 | 1/2009 | Hallgren |
| 2009/0025563 A1 | 1/2009 | Borgstrom |
| 2009/0151928 A1 | 6/2009 | Lawson |
| 2009/0169407 A1 | 7/2009 | Yun |
| 2009/0173095 A1 | 7/2009 | Bhatia |
| 2009/0266231 A1 | 10/2009 | Franzen |
| 2009/0304496 A1 | 12/2009 | Maier |
| 2009/0321343 A1 | 12/2009 | Maier |
| 2009/0324391 A1 | 12/2009 | Maier |
| 2010/0007133 A1 | 1/2010 | Maier |
| 2010/0007283 A1 | 1/2010 | Shimoyoshi et al. |
| 2010/0021292 A1 | 1/2010 | Maier |
| 2010/0038309 A1 | 2/2010 | Maier |
| 2010/0043288 A1 | 2/2010 | Wallace |
| 2010/0043364 A1 | 2/2010 | Curien |
| 2010/0044966 A1 | 2/2010 | Majot |
| 2010/0072121 A1 | 3/2010 | Maier |
| 2010/0074768 A1 | 3/2010 | Maier |
| 2010/0083690 A1 | 4/2010 | Sato |
| 2010/0090087 A1 | 4/2010 | Maier |
| 2010/0139776 A1 | 6/2010 | Auber |
| 2010/0143172 A1 | 6/2010 | Sato |
| 2010/0163232 A1 | 7/2010 | Kolle |
| 2010/0183438 A1 | 7/2010 | Maier |
| 2010/0239419 A1 | 9/2010 | Maier |
| 2010/0239437 A1 | 9/2010 | Maier |
| 2010/0247299 A1 | 9/2010 | Maier |
| 2010/0257827 A1 | 10/2010 | Lane |
| 2011/0017307 A1 | 1/2011 | Kidd |
| 2011/0061536 A1 | 3/2011 | Maier |

FOREIGN PATENT DOCUMENTS

| | | |
|---|---|---|
| CA | 2647511 | 10/2007 |
| DE | 1024439 B | 2/1958 |
| EP | 0150599 | 8/1985 |
| EP | 301285 | 10/1991 |
| EP | 561065 | 11/1991 |
| EP | 552837 | 1/1993 |
| EP | 1582703 | 10/2005 |
| EP | 2013479 | 1/2009 |
| EP | 7838631.5 | 12/2009 |
| EP | 2233745 | 9/2010 |
| EP | 2322282 | 5/2011 |
| EP | 1796808 | 7/2011 |
| GB | 417373 | 10/1934 |
| GB | 1192354 | 5/1970 |
| GB | 1512381 | 6/1978 |
| GB | 2323639 | 9/1998 |
| GB | 2337561 | 11/1999 |
| GB | 2477699 | 8/2011 |
| JP | 54099206 | 1/1978 |
| JP | 80 68501 | 3/1996 |
| JP | 8-284961 A | 11/1996 |
| JP | 2002 242699 | 8/2002 |
| JP | 3711028 | 10/2005 |
| JP | 2005291202 | 10/2005 |
| KR | 2009085521 | 2/2008 |
| MX | 2008012579 | 12/2008 |
| WO | WO9524563 | 9/1995 |
| WO | WO9619276 | 6/1996 |
| WO | WO0074811 | 12/2000 |
| WO | WO0117096 | 3/2001 |
| WO | WO2005003512 | 1/2005 |
| WO | WO2006029413 | 3/2006 |
| WO | WO2006053088 | 5/2006 |
| WO | WO2007043889 | 4/2007 |
| WO | WO2007103248 | 9/2007 |
| WO | WO2007120506 | 10/2007 |
| WO | WO2008036221 | 3/2008 |
| WO | WO2008039446 | 3/2008 |
| WO | WO2008039491 | 4/2008 |
| WO | WO2008039731 | 4/2008 |
| WO | WO2008039732 | 4/2008 |
| WO | WO2008039733 | 4/2008 |
| WO | WO2008039734 | 4/2008 |
| WO | WO2008036394 | 7/2008 |
| WO | WO2009111616 | 9/2009 |
| WO | WO2009158252 | 12/2009 |
| WO | WO2009158253 | 12/2009 |
| WO | WO2010065303 | 6/2010 |
| WO | WO2010083416 | 7/2010 |
| WO | WO2010083427 | 7/2010 |
| WO | WO2010107579 | 9/2010 |
| WO | WO2010110992 | 9/2010 |
| WO | WO2011034764 | 3/2011 |
| WO | WO2011100158 | 8/2011 |
| WO | WO2012009158 | 1/2012 |
| WO | WO2012009159 | 1/2012 |
| WO | WO2012012143 | 1/2012 |
| WO | WO2012033632 | 3/2012 |

OTHER PUBLICATIONS

Tri-Phase Rotary Separator Turbine, Multiphase Power & Processing Technologies LLC Technical Literature (available at http://www/mpptech.com/techpp/pdfs/Tri-Phase.pdf).

(56) References Cited

OTHER PUBLICATIONS

IRIS™ In-Line Rotary Separator/Scrubber, Multiphase Power & Processing Technologies LLC Technical Literature (available at http://www.mpptech.com/products/IRIS_Rev5.2PDF).
Testing of an In-Line Rotary Separator (IRIS™) at the Chevron F. Ramirez Gas Production Facility by Hank Rawlins and Frank Ting, Presented at 52nd Annual Laurence Reid Gas Conditioning Conference, The University of Oklahoma, Feb. 24-27, 2002.
Utilization of Inline Rotary Separator as a Wet Gas Meter by V.C. Ting Presented at the 19th North Sea Flow Measurement Workshop 2001.
Analysis of Results of a Rotary Separator Rubine on the Shell Ram-Powell TLP by Greg Ross, Keith Oxley and Hank Rowlins.
Field Test Results of a Rotary Separator Turbine on the Ram/Powell TLP by C.H. Rawlins and G.D. Ross, presented at the 2001 Offshore Technology Conference in Houston, Texas 4-30-5-3, 2001.
Two-Phase Flow Turbines in Oil and Gas Production and Processing by Geirmund Vislie and Simon RH Davies.
Further Developments of the Biphase Rotary Separator Turbine by Geirmund Vislie, Simon Davies and Lance Hays.
"Technical Manual—High Pessure Air Compressor Model 13NL45", Navsea S6220-AT-MMA-010/93236, Oct. 28, 1991, pp. 3-23 to 3-32, Electric Boat Corporation, Groton, CT 06340.
EP05796401—Supplementary European Search Report mailed Aug. 26, 2008.
EP10196474—European Search Report mailed Mar. 21, 2011.
PCT/GB95/00193 Notification of International Search Report mailed Jun. 2, 1995.
PCT/FI00/00496—International Search Report mailed Oct. 16, 2000.
PCT/US2005/032556—Notification of International Preliminary Report on Patentability mailed Mar. 13, 2007.
PCT/US2005/032556—Notification of International Search Report and Written Opinion mailed Oct. 18, 2006.
PCT/US2005/040664—Notification of International Search Report and Written Opinion mailed Oct. 17, 2006.
PCT/NO2006/000341—International Search Report mailed Jan. 11, 2007.
PCT/US2007/008149—International Preliminary Report on Patentability dated Sep. 30, 2008.
PCT/US2007/008149—Written Opinion dated Jul. 17, 2008.
PCT/US2007/020101—International Preliminary Report on Patentability dated Apr. 2, 2009.
PCT/US2007/020101—International Search Report dated Apr. 29, 2008.
PCT/US2007/020471—International Preliminary Report on Patentability dated Apr. 2, 2009.
PCT/US2007/020471—International Search Report and Written Opinion dated Apr. 1, 2008.
PCT/US2007/020659—International Preliminary Report on Patentability dated Mar. 31, 2009.
PCT/US2007/020659—International Search Report and Written Opinion dated Sep. 17, 2008.
PCT/US2007/020768—International Preliminary Report on Patentability dated Apr. 9, 2009.
PCT/US2007/020768—International Search Report and Written Opinion dated Mar. 3, 2008.
PCT/US2007/079348—International Preliminary Report on Patentability dated Apr. 9, 2009.
PCT/US2007/079348—International Search Report dated Apr. 11, 2008.
PCT/US2007/079348—Written Opinion mailed Apr. 11, 2008.
PCT/US2007/079349—International Preliminary Report on Patentability dated Mar. 31, 2009.
PCT/US2007/079349—International Search Report and Written Opinion dated Apr. 2, 2008.
PCT/US2007/079350—International Preliminary Report on Patentability mailed Apr. 9, 2009.
PCT/US2007/079350—International Search Report mailed Apr. 2, 2008.
PCT/US2007/079350—Written Opinion mailed Apr. 2, 2008.
PCT/US2007/079352—International Preliminary Report on Patentability dated Apr. 9, 2009.
PCT/US2007/079352—International Search Report and Written Opinion dated Aug. 27, 2008.
PCT/US2009/036142—International Preliminary Report on Patentability dated Sep. 16, 2010.
PCT/US2009/036142—International Search Report mailed May 11, 2009.
PCT/US2009/036142—Written Opinion dated May 11, 2009.
PCT/US2009/047662—International Preliminary Report on Patentability dated Jan. 13, 2011.
PCT/US2009/047662—Written Opinion dated Aug. 20, 2009.
PCT/US2009/064916—Notification of International Preliminary Report on Patentability mailed Jun. 16, 2011.
PCT/US2009/064916—Notification of International Search Report and Written Opinion mailed Jan. 25, 2010.
PCT/US2010/021199—International Preliminary Report on Patentability dated Mar. 29, 2011.
PCT/US2010/021199—International Search Report and Written Opinion dated Mar. 22, 2010.
PCT/US2010/021218—International Report on Patentability dated Feb. 2, 2011.
PCT/US2010/021218—International Search Report and Written Opinion dated Mar. 23, 2010.
PCT/US2010/025650—International Report on Patentability dated Mar. 14, 2011.
PCT/US2010/025650—International Search Report and Written Opinion dated Apr. 22, 2010.
PCT/US2010/025952—International Report on Patentability dated Mar. 14, 2011.
PCT/US2010/025952—International Search Report and Written Opinion dated Apr. 12, 2010.
PCT/US2011/023593—Notification of International Search Report and Written Opinion dated Oct. 18, 2011.
PCT/US2011/037112—Notification of International Search Report and Written Opinion mailed Jan. 13, 2012.
PCT/US2011/042205—Notification of International Search Report and Written Opinion mailed Feb. 21, 2012.
PCT/US2011/042209—International Search Report mailed Feb. 24, 2012.
PCT/US2011/042227—Notification of International Search Report dated Feb. 21, 2012.
PCT/US2011/048652—Notification of International Search Report and Written Opinion mailed Jan. 9, 2012.

RADIAL VANE PACK FOR ROTARY SEPARATORS

CROSS-REFERENCE TO RELATED APPLICATIONS

The present application is a national stage application of PCT Pat. App. No. PCT/US2011/042209 filed Jun. 28, 2011, which claims priority to U.S. Provisional Patent Application having Ser. No. 61/364,678, filed Jul. 15, 2010. These priority applications are incorporated herein in their entirety, to the extent consistent with the present application.

BACKGROUND

Separators for separating elements of a fluid based on density are used in various industrial applications. One type of separator, known as a rotary separator, includes a rotating element that centrifuges higher-density components of the fluid, such as liquid, from lower-density components, such as gas. Rotary separators can be positioned "in-line" and thus coupled on both the inlet and outlet ends to a hydrocarbon or other type of pipeline. Rotary separators, including in-line rotary separators, can also be attached to various other components, for example, compressors, other separators, and scrubbers. For example, rotary separators can be coupled to static separators (e.g., upstream from the rotary separator) and compressors (e.g., downstream from the rotary separator). The advantages of separating (e.g., "drying") the fluid prior to compressing or otherwise handling the fluid include increased device efficiency downstream, which can allow for greater flow rates, higher compression ratios, or both. Additionally, drying the fluid prior to introducing it to a compressor can avoid unnecessary wear on the compressor components.

Rotary separators can be driven to rotate by suitable drivers or can be "self-driven," converting some of the potential energy stored in the pressure of the fluid flow into rotational kinetic energy. Driven separators typically include a rotatable shaft connected to a drum. The shaft is rotated by the driver, which in turn rotates the drum. When flow enters the drum, the rotating drum applies a higher inertial force on the higher-density components of the fluid, propelling the higher-density components toward the outside of the flow where they can be collected. In self-driven separators, the fluid is generally directed through stationary nozzles and/or vanes positioned at the inlet of the drum to create a high-velocity swirling flow. The swirling flow rotates the drum, as opposed to the external driver, causing inertial separation similar to that of driven rotary separators.

Although suitably-sized and configured rotary separators perform well in a variety of applications, there remains a need for rotary separators with increased separation efficiency, which allows for higher flow rates, smaller-sized separators, better separation, lower pressure-drops, and/or combinations thereof.

SUMMARY

Embodiments of the disclosure may provide an exemplary apparatus for separating a fluid. The exemplary apparatus may include an inner drum wall disposed around and coupled to a shaft. The exemplary apparatus may also include an outer drum wall disposed around the inner drum wall, the outer drum wall being configured to rotate to separate a higher-density component of the fluid from a lower-density component of the fluid. The exemplary apparatus may further include a first radial vane disposed between the inner drum wall and the outer drum wall and having first contours configured to turn the fluid in at least one of a radially-inward direction and a radially-outward direction. The exemplary apparatus may also include a housing at least partially surrounding the outer drum wall and configured to receive the high-density component of the fluid therefrom.

Embodiments of the disclosure may also provide an exemplary method for separating a fluid. The exemplary method may include introducing a fluid to flow passages defined in a rotatable drum, one of the flow passages being an inter-vane flow passage defined between first and second radial vanes disposed in the rotatable drum. The exemplary method may also include turning the fluid in the inter-vane flow passage in a radially-inward direction using the first and second radial vanes, to partially separate a higher-density component of the fluid from a lower-density component thereof, and turning the fluid in the inter-vane flow passage in a radially-outward direction using the first and second radial vanes, to separate the higher-density component from the lower-density component. The exemplary method may also include rotating the rotatable drum to urge the high-density component toward a housing disposed around the rotatable drum.

Embodiments of the disclosure may further provide an exemplary fluid separator. The exemplary fluid separator may include a rotatable drum including inner and outer drum walls, the inner drum wall coupled to a shaft, the rotatable drum configured to receive a fluid at an upstream end, and to discharge the fluid at a downstream end and to rotate to separate a liquid from the fluid. The exemplary fluid separator may also include a radial vane pack disposed between the inner and outer drum walls and comprising radial vanes extending from proximal the upstream end to proximal the downstream end, each of the radial vanes having contours configured to turn the fluid at least one of about 30 degrees in a radially-inward direction and about 30 degrees in a radially-outward direction, and each of the radial vanes defining at least one drainage port extending radially therethrough. The exemplary rotary separator may also include struts extending at least partially between the inner and outer drum walls, each of the struts coupled to at least one of the radial vanes and defining a drainage duct in fluid communication with at least one of the drainage ports. The exemplary rotary separator may further include a housing at least partially surrounding the outer drum wall and being configured to receive the liquid separated by the drum.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
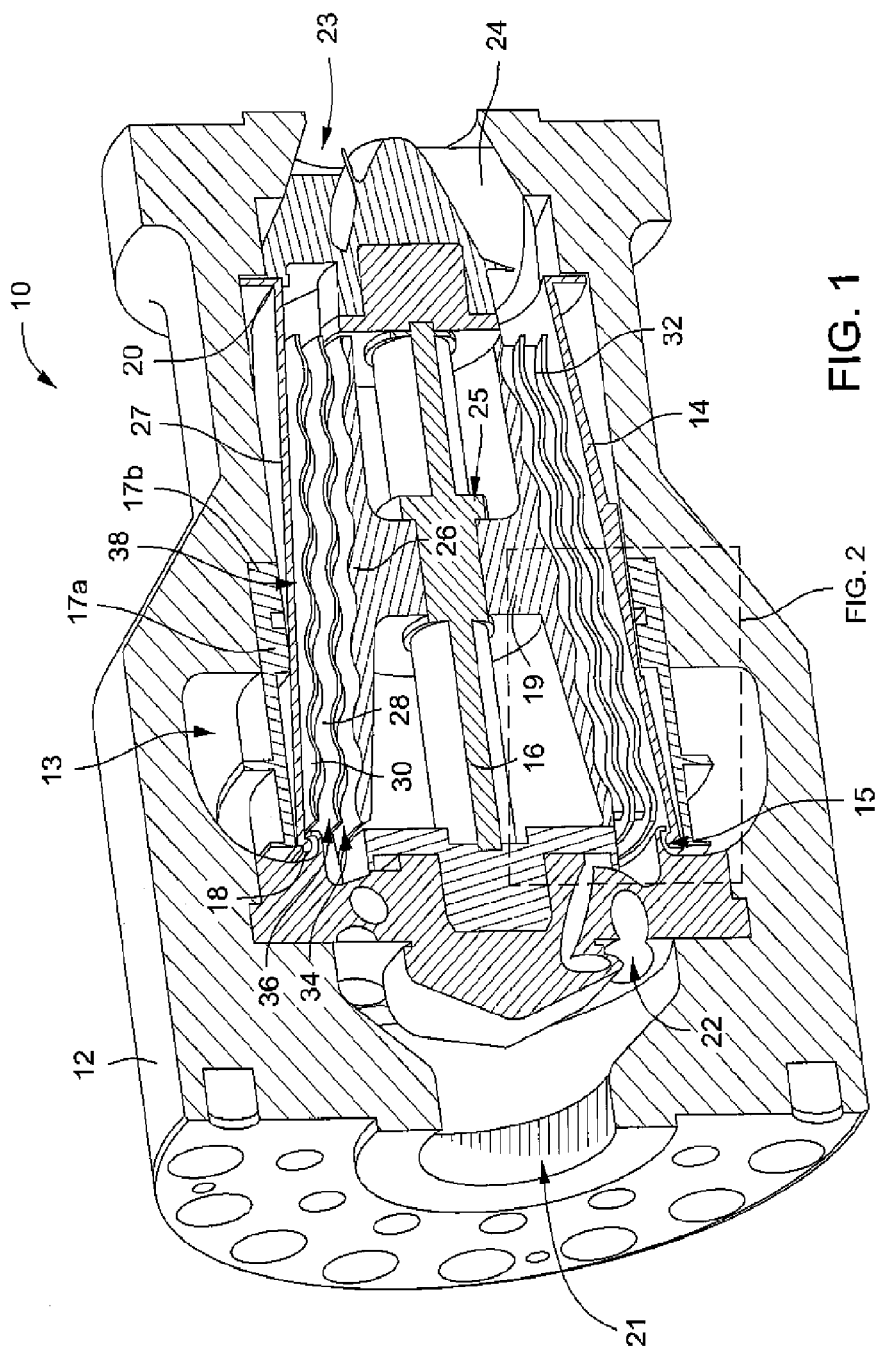
FIG. 1 illustrates a cut-away, perspective view of an exemplary rotary separator, according to one or more aspects of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein FIG. 1 illustrates a cut-away, perspective view of a rotary separator 10, according to an embodiment described. The rotary separator 10 includes a housing 12 and a rotatable drum 14 disposed therein and supported by a shaft 16. The housing 12 may include a generally toroidal collection chamber 13 defined therein and positioned around the drum 14. Although not shown, a drain may be attached to the housing 12 and be in fluid communication with the collection chamber 13. The collection chamber 13 may be in fluid communication with the drum 14 via an outlet passage 15 formed between the housing 12 and the drum 14 to allow separated fluid components to exit the drum 14, as will be described in greater detail below. In other embodiments, however, slits, openings, apertures, or the like may be defined in the housing 12 to allow separated fluid to exit the drum 14. Additionally, one or more seals (two are shown: 17a and 17b), which may be labyrinth seals, brush seals, dry gas seals, or the like, may be disposed between the drum 14 and the housing 12 to ensure fluids flow from the drum 14 to the collection chamber 13 and are not lost between the drum 14 and the housing 12.

The drum 14 has an upstream end 18 and a downstream end 20. An inlet channel 21 may be defined in the housing 12, upstream from the upstream end 18, and a diffuser channel 23 may be defined in the housing 12, downstream from the downstream end 20. A plurality of swirling structures 22 may be disposed the inlet channel 21, proximal the upstream end 18. The swirling structures 22 may be or include rotating or stationary guide vanes, nozzles (as shown), or the like. A plurality of de-swirling structures 24 may be disposed in the diffuser channel 23, proximal the downstream end 20. The de-swirling structures 24 may be or include stationary diffuser vanes (as shown), rotating vanes, stationary or rotating nozzles, or the like. In various embodiments, however, the swirling structures 22 and/or de-swirling structures 24 may be omitted.

In an embodiment, the shaft 16 may be stationary or rotatable and may be connected to the drum 14 with a bearing 25, for example, an active magnetic bearing. In some embodiments, the shaft 16 may be coupled to and driven by an external driver (not shown), which may be any driver that is capable of turning the shaft 16 at a suitable rate. In such an embodiment, the shaft 16 and the drum 14 may be coupled together such that the rotation of the shaft 16 rotates the drum 14.

The drum 14 includes an inner drum wall 26, an outer drum wall 27, and one or more radial vanes (two are shown: a first radial vane 28 and a second radial vane 30). The inner drum wall 26 may be coupled to the shaft 16 via the bearing 25 and/or a disk 19, which may be integral with or attached to the inner drum wall 26. In various embodiments, additional or fewer radial vanes may be employed, with the first and second radial vanes 28, 30 (and any additional radial vanes) collectively being referred to as a "radial vane pack." As shown, the first and second radial vanes 28, 30 may extend along a majority of the axial length of the drum 14 between the upstream end 18 and the downstream end 20. For example, the first and second radial vanes 28, 30 may extend from a location proximal the upstream end 18 to a location proximal the downstream end 20.

The first radial vane 28 is disposed around the inner drum wall 26 and inside the outer drum wall 27, and may be attached to either or both of the inner and outer drum walls 26, 27 with one or more struts 32. Furthermore, the first radial vane 28 may be radially offset from the inner drum wall 26 to define a first separation flow passage 34 therebetween. Similarly, the second radial vane 30 may be disposed inside the outer drum wall 27 and around the first radial vane 28 to define a second separation flow passage 36 between the first radial vane 28 and the second radial vane 30, and a third separation flow passage 38 between the second radial vane 30 and the outer drum wall 27. The second separation flow passage 36, since it is defined radially between the first and second radial vanes 28, 30, may be referred to herein as an "inter-vane flow passage." The second radial vane 30 may be attached to the inner and/or outer drum wall 26, 27, and/or to the first radial vane 28 using the struts 32. Additional radial vanes (not shown) may be similarly disposed between the inner and outer drum walls 26, 27.

In an embodiment, the inner and outer drum walls 26, 27 and the first and second radial vanes 28, 30 have a decreasing radius proceeding from the upstream end 18 toward the downstream end 20, as shown. The outlet passage 15 may be positioned proximal the upstream end 18. In other embodiments, the inner and outer drum walls 26, 27 and the first and second radial vanes 28, 30 may have other shapes; for example, each may have an area of increased radius in the axial middle thereof or at the downstream end 20, with the outlet passage 15 being positioned near the area of increased radius. Furthermore, the first and second radial vanes 28, 30 and the inner drum wall 26 may be contoured along all or at least a portion of the axial lengths thereof. In embodiments in which additional radial vanes (not shown) are present, they may also be contoured or they may be flat.

Figure 2:
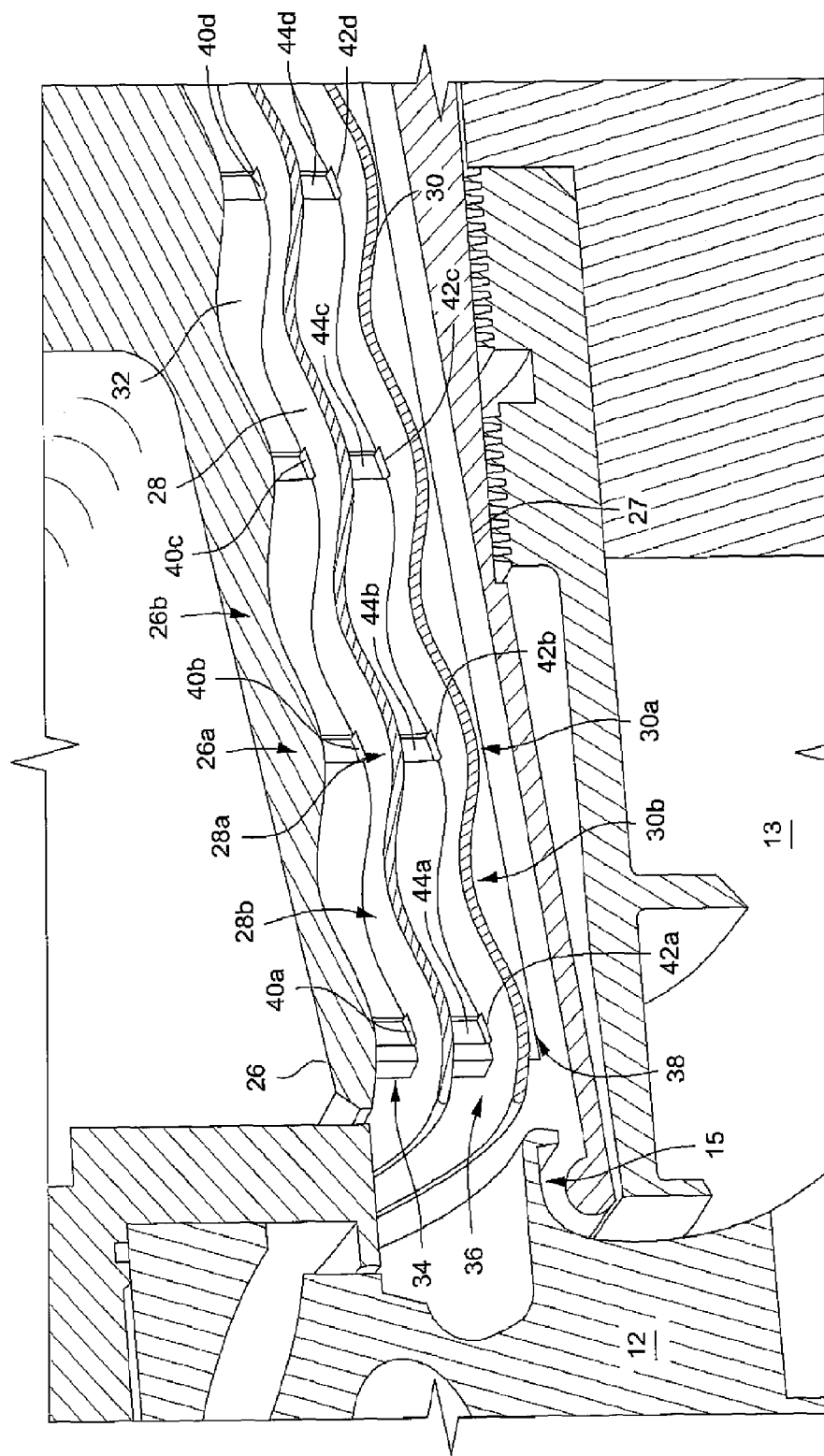
FIG. 2 illustrates an enlarged, partial view of FIG. 1, as indicated by the box labeled "FIG. 2" in FIG. 1.

FIG. 2 illustrates an enlarged view of a portion of the exemplary rotary separator 10 of FIG. 1, as indicated by the box shown in FIG. 1. Accordingly, with continued reference to FIG. 1, the contours of the inner drum wall 26 and the first and second radial vanes 28, 30 are configured to turn fluid flowing therepast in at least one of a radially-inward direction and a radially-outward direction. The contours of the inner drum wall 26 and the first and second radial vanes 28, 30 may include a plurality of prominences 26a, 28a, 30a, respectively, and a plurality of depressions 26b, 28b, and 30b, respectively. At the prominences 26a, 28a, 30a, the inner drum wall 26 and the first and second radial vanes 28, 30 each extend radially outward. Correspondingly, at the depressions 26b, 28b, 30b, the inner drum wall 26 and the first and second radial vanes 28, 30 each extend radially inward. As shown, each of the inner drum wall 26 and the first and second radial vanes 28, 30 may have multiple prominences 26a, 28a, 30a, respectively, and/or multiple depressions 26b, 28b, 30b, respectively. The contours of the inner drum wall 26 and the first and second radial vanes 28, 30, may turn fluid flowing through the first, second, and/or third flow passages 34, 36, 38 a maximum of about 30 degrees from axial in the radial-outward direction and a maximum of about 30 degrees from axial in the radial-inward direction.

Furthermore, each of the prominences 26a, 28a, 30a may be bordered on one or both axial sides by one of the depressions 26b, 28b, 30b, and vice versa, such that, in an embodiment, the prominences 26a, 28a, 30a and depressions 26b, 28b, 30b alternate. Accordingly, in cross-section, the inner drum wall 26 and the first and second radial vanes 28, 30 may have a sinusoidally-shaped topography, as shown. Various other contour patterns and topographies are, however, contemplated herein, including flat or uncurved portions and/or truncated depressions 26b, 28b, 30b and/or prominences 26a, 28a, 30a. Further, the contours need not be smoothly curved, as shown, and but may take any suitable shape, for example, a plurality of bends or corners may be employed. Additionally, embodiments in which one or more of the first and second radial vanes 28, 30 (and/or any additional vanes) are not contoured are also contemplated herein. Moreover, although not shown, the outer drum wall 27 may be contoured to define a sinusoidally-shaped topography, such as described with respect to the inner drum wall 26 and the first and second radial vanes 28, 30.

Further, the contours of the inner drum wall 26 and the first and second radial vanes 28, 30 may be aligned, as shown. For example, each prominence 26a of the inner drum wall 26 may be axially-aligned with each prominence 28a of the first radial vane 28, which may in turn be axially-aligned with each prominence 30a of the second radial vane 30. Similarly, each depression 26b of the inner drum wall 26 may be aligned with each prominence 28a of the first radial vane 28, which may in turn be aligned with each prominence 30a of the second radial vane 30, as shown. The first and second flow passages 34, 36 may thus be winding or tortuous, such that fluid proceeding axially therethrough is, for example, turned radially inward and then turned radially outward in a repeating fashion. The third flow passage 38 may also be winding or tortuous, however, in an embodiment, it may be less so if it is defined between the second radial vane 30 and the flat outer drum wall 27.

Figure 3:
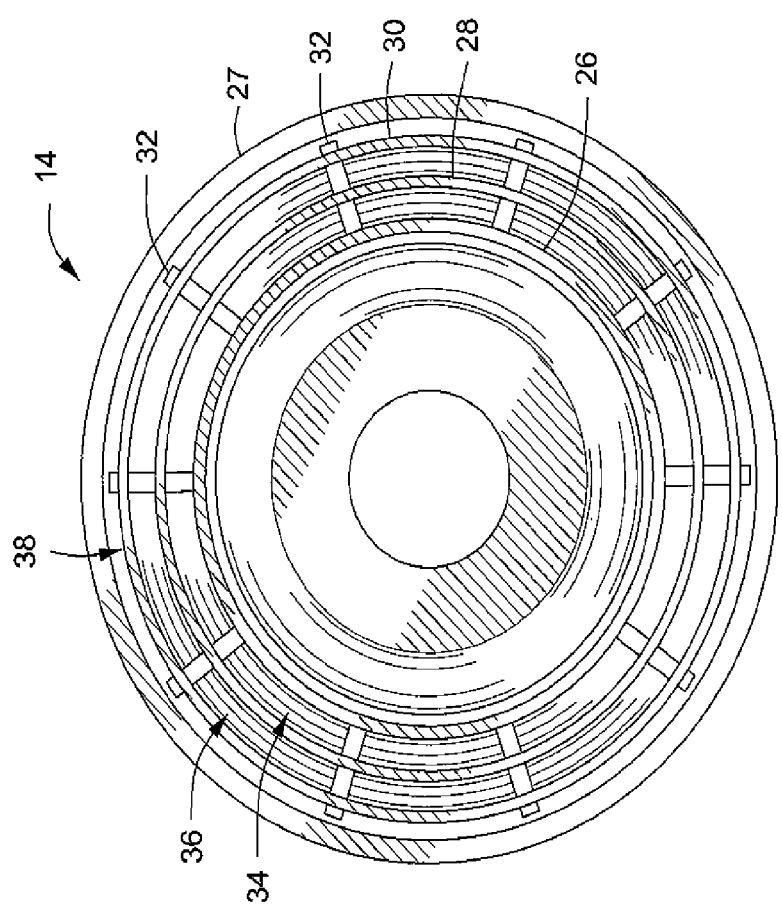
FIG. 3 illustrates an end view of an exemplary drum of the rotary separator, according to one or more aspects of the disclosure.

FIG. 3 illustrates an end view of the drum 14, from upstream looking downstream, according to an embodiment described. As shown, the inner drum wall 26, first and second radial vanes 28, 30, and outer drum wall 27 may be radially spaced apart to define the first, second, and third separation flow passages 34, 36, 38 therebetween. Additionally, the struts 32 may extend radially from the inner drum wall 26 through the first and second radial vanes 28, 30 and to the outer drum wall 27. The struts 32 may be straight in the radial direction, the axial direction, or, as shown, in both directions, such that the struts 32 provide minimal obstruction to the first, second, and/or third flow passages 34, 36, 38.

Furthermore, although not shown, the struts 32 may be segmented, having multiple parts extending partially between the inner and outer drum walls 26, 27. For example, the struts 32 may be broken apart by the first and/or second radial vanes 28, 30, such that, for example, a strut segment connects the first radial vane 28 to the inner drum wall 26, a second strut segment connects the second radial vane 30 to the first radial vane 28, and a third strut segment connects the outer drum wall 27 to the second radial vane 30. If the struts 32 are segmented (not shown), the strut segments of each strut 32 may reside in the same radial plane or may be staggered.

Referring again to FIG. 2, in an embodiment, the first and second radial vanes 28 and 30 each define drainage ports (four are shown in both: 40a, 40b, 40c, 40d and 42a, 42b, 42c, 42d, respectively) extending radially therethrough. The drainage ports 40a-d, 42a-d may be located at the prominences 28a, 30a and, for example, at the peak or apex thereof, where a line drawn tangent to the first or second radial vane 28, 30 has a slope of substantially zero. In other embodiments, however, the drainage ports 40a-d and 42a-d may be defined in other locations on the first and second radial vanes 28, 30.

The struts 32 may define drainage ducts (four are shown: 44a, 44b, 44c, 44d) extending radially therein or thereon. As shown, the drainage ducts 44a-d may be open grooves; however, in other exemplary embodiments, the drainage ducts 44a-d may be substantially enclosed with openings formed therein (not shown). The drainage ducts 44a-d may each extend radially from the inner drum wall 26 to one of the drainage ports 40a-d of the first radial vane 28. The drainage ducts 44a-d may each further extend through the drainage port 40a-d and each may extend to one of the drainage ports 42a-d of the second radial vane 30. The drainage ducts 44a-d may also extend through the drainage ports 42a-d and to the outer drum wall 27.

Although only four sets of drainage ports 40a-d and 42a-d and drainage ducts 44a-d are shown, it will be appreciated that additional drainage ports and ducts may be included without departing from the scope of this disclosure. For example, rows of drainage ports may be defined around the first and second radial vanes 28, 30 at the axial locations of the four shown drainage ports 40a-d and 42a-d, respectively, and corresponding drainage ducts may be defined in the struts 32. Moreover, with additional reference to FIG. 1, single ports, such as those shown, and/or additional rows of ports may be defined at intervals along up to the entirety of the axial length of the drum 14.

With reference to FIGS. 1-3, in exemplary operation of the rotary separator 10, a fluid having a higher-density component and a lower-density component enters the inlet channel 21 for separation. The fluid may be a multiphase fluid, such as a liquid-gas mixture, but it may also be a combination of two or more gasses or liquids of different densities. Further, the higher-density component may be or additionally include a solid component, e.g., particulate matter. In an embodiment, the inlet channel 21 increases the radius of the flow therein, changing it from the circular cross-section of a pipe to an annular cross-section.

The fluid may then be passed to the swirling structures 22, which are stationary nozzles or vanes. However, as discussed, the swirling structures 22 may be omitted, for example, in embodiments in which the shaft 16 is driven by an external driver. In the illustrated embodiment, the swirling structures 22 swirl the fluid, providing a circumferential component to the velocity of the flow. The swirled fluid is then divided among the first, second, and third flow passages 34, 36, 38. The drag forces resulting from the moving fluid engaging one or more of the slower-moving outer drum wall 27, first and second radial vanes 28, 30, and/or inner drum wall 26 cause the drum 14 to rotate. The various components of the drum 14 may rotate as a single unit, including the inner and outer drum walls 26, 27 and the first and second radial vanes 28, 30 (and any additional vanes included in the radial vane pack). In other embodiments, one or both of the first and second radial vanes 28, 30 (and/or one or more of any additional radial vanes) and/or the inner drum wall 26 may be stationary with respect to the rotation of the drum 14. The rotation of the drum 14 induces an inertial force on the fluid, which propels the higher-density components toward the radially outer-most extreme of the drum 14 with greater force than it propels the lower-density components radially-outward, thereby causing the components to separate based on density.

While traversing the first, second, and/or third flow passages 34, 36, 38 the fluid is turned in a radially-inward direction and/or in a radially-outward direction, for example, multiple times each, due to the above-described contours of the inner drum wall 26, the first radial vane 28, and/or the second radial vane 30. Such turning applies a second inertial force on the fluid, in addition to the rotationally-induced inertial force, which urges the higher-density component toward the radial extremes of the first and second flow passages 34, 36. The higher-density component collects on the inner drum wall 26, the first radial vane 28, and/or the second radial vane 30 as it comes into contact therewith. In an embodiment, the higher-density component separated by the turning then collects in the drainage ducts 44a-d of the struts 32. The continued rotation of the drum 14, including the struts 32, causes the higher-density component to flow in the drainage ducts 44a-d, through any drainage ports 40a-d and/or 42a-d, and to the outer drum wall 27.

The outer drum wall 27, as described above, may be tapered such that its radius is at a maximum at the upstream end 18 of the drum 14. Due to the rotation of the drum 14, the higher-density component seeks to flow to the area farthest from the rotational centerline of the drum 14, and thus proceeds along the outer drum wall 27 to the area of greatest radius, which, in an embodiment, is the upstream end 18. Once reaching this location, the separated higher-density component, potentially along with a portion of the lower-density component, proceeds into the collection chamber 13 via the outlet passage 15, with the seals 17a, 17b, ensuring that little or substantially none of the fluid flowing therethrough flows between the drum 14 and the housing 12 to remix with the fluid flowing downstream from the drum 14.

The fluid remaining after separation, which may be substantially all lower-density component, but may include small amounts of unseparated higher-density component, may then proceed to the diffuser channel 23. In embodiments including them, the de-swirling structures 24 disposed in the diffuser channel 23 may de-swirl the fluid, removing some or all of the circumferential velocity component of the fluid flowing therepast. The fluid may then proceed to components disposed downstream from the rotary separator 10 for further manipulation and/or use, such as, for example, a compressor, a turbine, a scrubber, or the like.

Figure 4:
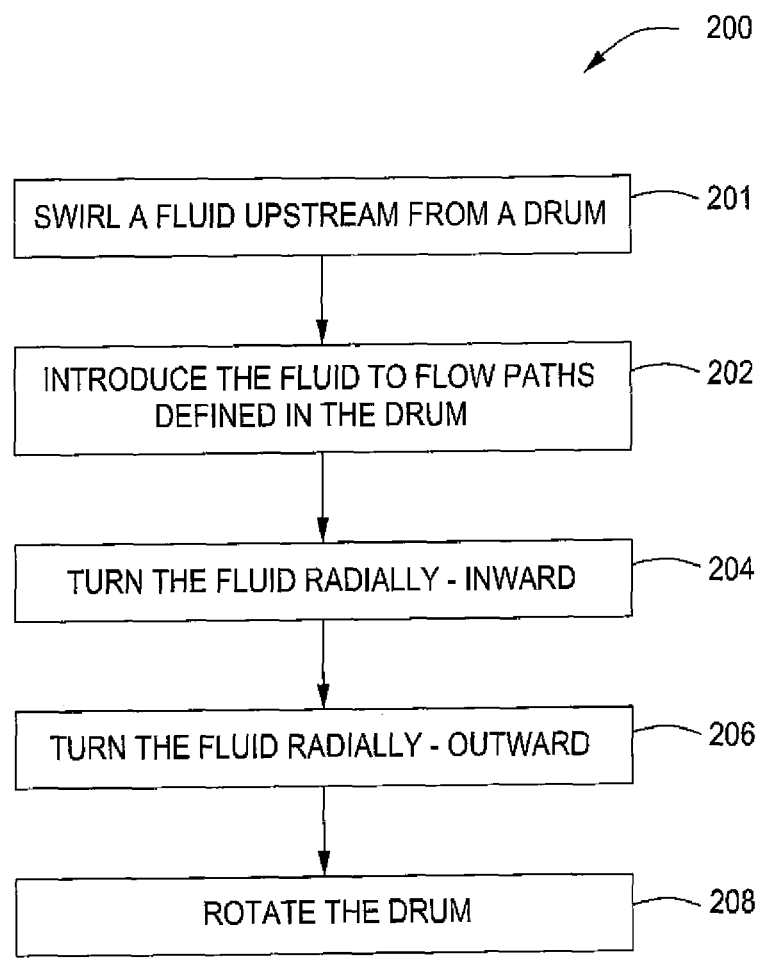
FIG. 4 illustrates a flowchart of an exemplary method for separating a fluid, according to one or more aspects of the disclosure.

FIG. 4 illustrates a flowchart of a method 200 for separating a high-density component from a low-density component of a fluid. In an embodiment, the method 200 proceeds by operation of the rotary separator 10 described above with reference to FIGS. 1-3. The method 200 may include swirling the fluid upstream of the drum using swirling structures such as inlet nozzles or vanes to provide rotational energy for the rotary separator, as at 201. The drum may be supported during rotation, for example, magnetically supported, on a stationary shaft and attached thereto with a bearing.

The method 200 may proceed to introducing a fluid to a plurality of flow passages defined in a rotatable drum, as at 202. At least one of the plurality of flow passages may be an inter-vane flow passage, e.g., defined between first and second radial vanes. The method 200 may also include turning the fluid in at least one of the flow passages toward a radially-inward direction using the first and second radial vanes, to partially separate the higher-density component from the lower-density component, as at 204. The method 200 may further include turning the fluid in at least one of the flow passages toward a radially-outward direction, using the first and second radial vanes, to separate the higher-density component from the lower-density component, as at 206. It will be appreciated that the order of 204 and 206 may be reversed and/or repeated multiple times, for example, in an alternating fashion. In an embodiment, the fluid may be turned less than about 30 degrees from axial toward radially inward and less than about 30 degrees from axial toward radially outward. Further, the turning may be a result of the radial vanes being contoured, such as with the first and second radial vanes 28, 30 shown in and described above with reference to FIGS. 1-3.

The method 200 may also include rotating the rotatable drum to urge the high-density component toward a housing disposed around the rotatable drum, as at 208. The rotating at 208 may take place prior to, during, and/or after the turning at 204 and/or 206. The rotation may apply a greater inertial force on the higher-density component of the fluid, causing it to separate from the lower-density component and migrate to the outer-most surface of the drum for collection. Additionally, the rotation of the drum may cause the higher-density components separated in the tortuous flow passages to collect on struts and then migrate to the outer-most surface of the drum to join the rest of the separated higher-density component for collection. Additionally, the method 200 may also include supporting the drum with a shaft connected to the drum with a bearing, which may be, for example, a magnetic bearing.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. An apparatus for separating a fluid, comprising:
   an inner drum wall disposed around and coupled to a shaft;
   an outer drum wall disposed around the inner drum wall, the outer drum wall being configured to rotate to separate a higher-density component of the fluid from a lower-density component of the fluid;
   a first radial vane disposed between the inner drum wall and the outer drum wall and having first contours configured to turn the fluid in at least one of a radially-inward direction and a radially-outward direction; and
   a housing at least partially surrounding the outer drum wall and configured to receive the high-density component of the fluid therefrom.

2. The apparatus of claim 1, wherein the first contours comprise first prominences where the first radial vane extends radially-outward and first depressions where the first radial vane extends radially-inward.

3. The apparatus of claim 2, wherein the first radial vane has drainage ports defined radially therethrough.

4. The apparatus of claim 3, wherein the drainage ports are located at the first prominences.

5. The apparatus of claim 3, further comprising struts extending between the inner and outer drum walls and coupled to the first radial vane, at least one of the struts defining a drainage duct fluidly communicating with at least one of the drainage ports.

6. The apparatus of claim 2, wherein the first prominences and the first depressions alternate proceeding axially.

7. The apparatus of claim 1, further comprising a second radial vane disposed around the first radial vane, spaced radially therefrom, and having second contours configured to direct the fluid in at least one of the radially-inward direction and the radial-outward direction.

8. The apparatus of claim 7, wherein the inner drum wall, the first radial vane, and the second radial vane rotate along with the outer drum wall.

9. The apparatus of claim 7, wherein:
   the first contours comprise first prominences where the first radial vane extends radially-outward and first depressions where the first radial vane extends radially-inward; and
   the second contours comprise second prominences where the second radial vane extends radially-outward and first depressions where the second radial vane extends radially-inward, the first and second prominences being axially-aligned, and the first and second depressions being axially-aligned.

10. The apparatus of claim 1, wherein the inner drum wall defines inner drum prominences where the inner drum wall extends radially-outward, and inner drum depressions where the inner drum wall extends radially-inward.

11. The apparatus of claim 1, wherein the shaft is connected to the inner drum wall with a magnetic bearing.

12. The apparatus of claim 1, wherein the first contours are configured to turn the fluid 30 degrees in the radial-inward direction and 30 degrees in the radial-outward direction.

13. A method for separating a fluid, comprising:
   introducing a fluid to flow passages defined in a rotatable drum, one of the flow passages being an inter-vane flow passage defined between first and second radial vanes disposed in the rotatable drum;
   turning the fluid in the inter-vane flow passage in a radially-inward direction using the first and second radial vanes, to partially separate a higher-density component of the fluid from a lower-density component thereof;
   turning the fluid in the inter-vane flow passage in a radially-outward direction using the first and second radial vanes, to separate the higher-density component from the lower-density component; and
   rotating the rotatable drum to urge the high-density component toward a housing disposed around the rotatable drum.

14. The method of claim 13, further comprising:
   collecting the higher-density component separated by turning the fluid in the inter-vane flow passage toward the radially-inward direction and by turning the fluid in the intervene flow passage toward the radially-outward direction on least one of the first and second radial vanes; and
   draining the higher-density component collected on the at least one of the first and second radial vanes through ports defined through at least one of the first and second radial vanes.

15. The method of claim 14, wherein draining the higher-density component comprises collecting the high-density component in a drainage conduit aligned with at least one of the drainage ports, the drainage conduit being defined in a strut that connects at least the first and second radial vanes together.

16. The method of claim 13, wherein rotating the rotatable drum comprises:
   swirling the fluid with swirling structures located proximal an upstream end of the drum; and
   supporting the drum with a shaft connected to the drum with a bearing.

17. The method of claim 13, further comprising magnetically supporting the drum on a shaft.

18. A fluid separator, comprising:
   a rotatable drum including inner and outer drum walls, the inner drum wall coupled to a shaft, the rotatable drum configured to receive a fluid at an upstream end, and to discharge the fluid at a downstream end and to rotate to separate a liquid from the fluid;
   a radial vane pack disposed between the inner and outer drum walls and comprising radial vanes extending from proximal the upstream end to proximal the downstream end, each of the radial vanes having contours configured to turn the fluid at least one of 30 degrees in a radially-inward direction and 30 degrees in a radially-outward direction, and each of the radial vanes defining at least one drainage port extending radially therethrough;
   struts extending at least partially between the inner and outer drum walls, each of the struts coupled to at least one of the radial vanes and defining a drainage duct in fluid communication with at least one of the drainage ports; and
   a housing at least partially surrounding the outer drum wall and being configured to receive the liquid separated by the drum.

19. The fluid separator of claim 18, wherein the contours of each of the radial vanes comprise prominences and depressions, the prominences of each of the radial vanes being axially-aligned and the depressions of each of the radial vanes being axially-aligned to define tortuous flow passages between the radial vanes.

20. The fluid separator of claim 19, wherein the inner drum wall includes circumferentially-extending contours comprising prominences axially-aligned with the prominences of the radial vanes and depressions axially-aligned with the depressions of the radial vanes to define a tortuous flow passage between the radial vane pack and the inner drum wall.

* * * * *